US009106447B2

(12) United States Patent
Lee

(10) Patent No.: US 9,106,447 B2
(45) Date of Patent: Aug. 11, 2015

(54) SYSTEMS, METHODS AND APPARATUS FOR PROVIDING UNREAD MESSAGE ALERTS

(75) Inventor: Michael M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 614 days.

(21) Appl. No.: 12/006,695

(22) Filed: Jan. 3, 2008

(65) Prior Publication Data

US 2009/0177617 A1 Jul. 9, 2009

(51) Int. Cl.
*G06F 17/30* (2006.01)
*H04L 12/58* (2006.01)
*G06Q 10/10* (2012.01)

(52) U.S. Cl.
CPC .......... *H04L 12/58* (2013.01); *G06F 17/30038* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 5,873,107 A * | 2/1999 | Borovoy et al. | 715/234 |
| 5,875,231 A | 2/1999 | Farfan et al. | |
| 5,901,209 A | 5/1999 | Tannenbaum et al. | |
| 6,269,369 B1 * | 7/2001 | Robertson | 709/1 |
| 6,542,739 B1 | 4/2003 | Garner | |
| 6,807,259 B1 | 10/2004 | Patel et al. | |
| 6,934,738 B1 * | 8/2005 | Furusawa et al. | 709/206 |
| 7,092,698 B1 | 8/2006 | Sharp et al. | |
| 7,145,898 B1 | 12/2006 | Elliott | |
| 7,181,017 B1 | 2/2007 | Nagel et al. | |
| 7,225,187 B2 * | 5/2007 | Dumais et al. | 707/3 |
| 7,430,582 B1 * | 9/2008 | Bates et al. | 709/207 |
| 7,849,154 B2 | 12/2010 | Grecco et al. | |
| 8,121,897 B2 | 2/2012 | Shu et al. | |
| 2001/0005855 A1 | 6/2001 | Shaw et al. | |
| 2001/0032137 A1 | 10/2001 | Bennett et al. | |
| 2002/0054080 A1 * | 5/2002 | Belanger et al. | 345/738 |
| 2002/0136384 A1 | 9/2002 | McCormack et al. | |
| 2002/0172338 A1 | 11/2002 | Lee et al. | |

(Continued)

FOREIGN PATENT DOCUMENTS

JP 2008176358 7/2008

OTHER PUBLICATIONS

PCT International Search Report (dated Apr. 20, 2009), International Application No. PCT/US2008/014063, International Filing Date—Dec. 23, 2008, (13 pages).

(Continued)

*Primary Examiner* — Robert Beausoliel, Jr.
*Assistant Examiner* — Nirav K Khakhar
(74) *Attorney, Agent, or Firm* — Blakely, Sokoloff, Taylor & Zafman LLP

(57) ABSTRACT

The present invention includes systems, apparatus and methods for providing message alerts to a user prior to that user communicating with a second party. The user may desire to communicate with a second party by sending a text-based message or by speaking to them through a communications device, such as a cellular phone. Prior to sending the message or speaking with the second party, the device can provide the user with message alerts, the option to review alert content, and/or to view the alert content itself. The message alerts and alert content can be notifications and/or previews of opened/unopened e-mail messages, voicemail messages, text messages, etc. Alert content can be located based on, for example, contact information of the person with whom the user desires to communicate, subject line data of a text-based message, main body data of a text based message, etc.

21 Claims, 13 Drawing Sheets

(56) References Cited

U.S. PATENT DOCUMENTS

| | | |
|---|---|---|
| 2003/0112927 A1 | 6/2003 | Brown et al. |
| 2003/0143983 A1* | 7/2003 | Crampton ............... 455/414 |
| 2004/0002972 A1* | 1/2004 | Pather et al. ............... 707/6 |
| 2004/0073607 A1* | 4/2004 | Su et al. ............... 709/203 |
| 2004/0116183 A1 | 6/2004 | Prindle |
| 2004/0133640 A1 | 7/2004 | Yeager et al. |
| 2004/0203660 A1 | 10/2004 | Tibrewal et al. |
| 2004/0215793 A1* | 10/2004 | Ryan et al. ............... 709/229 |
| 2004/0236749 A1* | 11/2004 | Cortright et al. ............... 707/9 |
| 2004/0249650 A1 | 12/2004 | Freedman et al. |
| 2005/0021713 A1 | 1/2005 | Dugan et al. |
| 2005/0043060 A1 | 2/2005 | Brandenberg et al. |
| 2005/0091272 A1* | 4/2005 | Smith et al. ............... 707/104.1 |
| 2005/0111631 A1* | 5/2005 | Jordan, Jr. ............... 379/88.12 |
| 2005/0130631 A1 | 6/2005 | Maguire et al. |
| 2005/0147256 A1 | 7/2005 | Peters et al. |
| 2005/0201531 A1 | 9/2005 | Kanter et al. |
| 2005/0249345 A1 | 11/2005 | Burg et al. |
| 2005/0286691 A1 | 12/2005 | Taylor et al. |
| 2006/0003783 A1 | 1/2006 | Fukui et al. |
| 2007/0049335 A1 | 3/2007 | Haitani et al. |
| 2007/0100698 A1 | 5/2007 | Neiman et al. |
| 2007/0192467 A1 | 8/2007 | Keeler |
| 2007/0206566 A1 | 9/2007 | Bennett |
| 2007/0210908 A1* | 9/2007 | Putterman et al. ............... 340/506 |
| 2007/0225030 A1 | 9/2007 | Teague |
| 2007/0250581 A1* | 10/2007 | Patel et al. ............... 709/206 |
| 2008/0086431 A1* | 4/2008 | Robinson et al. ............... 706/11 |
| 2008/0254773 A1 | 10/2008 | Lee |
| 2008/0254774 A1 | 10/2008 | Lee |
| 2009/0002127 A1* | 1/2009 | Kraft et al. ............... 340/7.52 |
| 2009/0055220 A1 | 2/2009 | Rapaport et al. |
| 2009/0109957 A1 | 4/2009 | Caradec et al. |
| 2009/0177617 A1 | 7/2009 | Lee |
| 2009/0262668 A1 | 10/2009 | Hemar et al. |

OTHER PUBLICATIONS

Non-Final Office Action (dated Dec. 17, 2009), U.S. Appl. No. 11/786,848, filed Apr. 12, 2007, First Named Inventor: Michael M. Lee, 17 pages.

Non-Final Office Action (dated Jan. 12, 2010), U.S. Appl. No. 11/787,156, filed Apr. 12, 2007, First Named Inventor: Michael M. Lee, (26 pages).

Final Office Action (dated Apr. 29, 2010), U.S. Appl. No. 11/786,848, filed Apr. 12, 2007, First Named Inventor: Michael M. Lee, (14 pages).

Final Office Action (dated Jul. 7, 2010), U.S. Appl. No. 11/787,156, filed Apr. 12, 2007, First Named Inventor: Michael M. Lee, (27 pages).

Non-Final Office Action (dated Feb. 2, 2011), U.S. Appl. No. 11/787,156, filed Apr. 12, 2007, First Named Inventor: Michael M. Lee, (16 pages).

Non-Final Office Action (dated Dec. 7, 2011), U.S. Appl. No. 11/786,848, filed Apr. 12, 2007, First Named Inventor: Michael M. Lee, (32 pages).

Non-Final Office Action (dated Feb. 22, 2012), U.S. Appl. No. 13/297,954, filed Nov. 16, 2011, First Named Inventor: Michael M. Lee, (18 pages).

Final Office Action (dated May 15, 2012), U.S. Appl. No. 11/786,848, filed Apr. 12, 2007, First Named Inventor: Michael M. Lee, (42 pages).

Final Office Action (dated Jul. 12, 2012), U.S. Appl. No. 13/297,954, filed Nov. 16, 2011, First Named Inventor: Michael M. Lee, (20 pages).

Final Office Action (dated May 15, 2012), U.S. Appl. No. 11/786,848, filed Apr. 12, 2007, First Named Inventor: Michael M. Lee, 42 pages.

* cited by examiner

SYSTEMS, METHODS AND APPARATUS FOR PROVIDING UNREAD MESSAGE ALERTS

FIELD OF THE INVENTION

This relates to systems, methods and apparatus for providing unread message alerts to a user. More particularly, the present invention can inform a user prior to: calling, SMS text messaging, e-mailing, or otherwise facilitating communications with a second party, if the user has unread messages from the second party. Additionally, the present invention can present the user with relevant messages, whether read or unread, prior to facilitating communications with a second party.

BACKGROUND OF THE INVENTION

Nowadays, as the world becomes more global, the different ways that people can communicate with other people around the world have rapidly been increasing in number and popularity. People may now utilize an eclectic assortment of devices and systems such as, for example, cellular phones, e-mail, SMS text messaging, iChat™, and instant messaging through a client such as AOL Instant Messenger™ to communicate with each other. However, it sometimes seems that the communication and messaging services can be utilized to such an extent that the user is unable to efficiently keep track of what messages that were received.

For example, oftentimes a person may have one or more unread e-mail or voice-mail messages in their possession. However, the user may be unaware of these unread messages or unwilling to sort through the messages (due, for example, to the number of unread messages) and might e-mail someone with a question, who might have already answered that question in one of the unviewed communications. The user may do this despite the fact that the answer to the user's question (or relevant information) may already be present in the user's unread messages. Thus, the user could be wasting valuable time and resources by communicating with the other person when this communication might be wholly unnecessary and redundant.

This scenario can occur not only when the user has unread e-mail messages, but may also occur when the user has, for example, unheard voicemail messages or unread SMS text messages, or any other form of communications. Additionally, this scenario may also occur when the user attempts to, for example, call on a cellular phone, call through a computer-based system such as iChat™, SMS text message, or instant message, a second party. As used in this text, "second party" or "second parties" refers to a person with whom the user desires to communicate and/or send a message.

As another example, a user may have messages which are opened and/or unopened, but is unable or unwilling to manually keep track of their content. This may occur because the user may simply have received so many messages during a given period of time, it may be too difficult to go through them all quickly (e.g., users are often inaccessible during a cross-country flight in the middle of the business day, and there may be 100 or more messages waiting for the user once wireless communications are permitted). Thus, the user may desire to communicate with a second party regarding a certain topic and even though the user may already in possession of messages which are relevant to the topic. However, the user may, for example, not remember the content of the messages, not remember where the messages are located, be unwilling to retrieve the messages, etc. In this case, the user may be wasting time and resources by communicating with a second party regarding a topic when the user may already be in possession of the information relevant to this topic. The present invention relates to systems and methods for providing a user with unread and/or relevant messages prior to communicating with a second party.

SUMMARY OF THE INVENTION

In accordance with the present invention, systems, methods and apparatus for providing message alerts are discussed herein. An electronic device for use in communicating with a second party, such as a cellular phone, Blackberry™, personal computer, etc., can present unread message alerts to a user when the user attempts to communicate with the second party. Additionally, an electronic device may present relevant message alerts to a user for messages that may have already been viewed when the user tries to communicate with the second party.

In some embodiments, the electronic device (sometimes referred to herein as the "user device") may present the user with unread message alerts prior to the user communicating with a second party. For example, the user device may present the unread message alerts before the user sends an e-mail, before the user sends an SMS text message, before the user sends an instant message, before the user connects to the second party through a cellular network, before the user connects to the second party through a VoIP network, before the user calls the second party through a software related program such as iChat™, etc. The unread message alerts may be notifications and/or previews of unread e-mails, text messages, voicemails, voicemails which have been converted to text, etc.

In one embodiment, the user device may present all unread messages to the user. In another embodiment, the user device may present relevant unread messages to the user. For example, the user device may present all unread messages received from the same party with whom the user would like to communicate. For instance, if the user is sending a message to "John Smith", the user device may present the user with all unread messages received from "John Smith". As another example, the user device may present all unread messages related to the same topic as the message which the user would like to send to the second party. For instance, if a user is sending a message to a second party regarding "the project meeting on Wednesday", the user device may locate all unread messages relating to "the project meeting on Wednesday" and present them to the user. In another embodiment, the user device may only present the user with certain types of unread messages. For example, the user device may only present unread e-mail messages, unread SMS text messages, unopened voicemails, etc.

In another embodiment, the user device may present the user with read and/or unread (opened and/or unopened) message alerts. In this case, the user device may present, for example, all messages received from the same party with whom the user would like to communicate. As another example, the user device may present the user with relevant messages that pertain to the same topic as the message which the user would like to send to the second party. This may allow the user to view the history and background information of his desired message prior to sending the message to the second party.

Persons of ordinary skill in the art will appreciate that at least some of the various embodiments described herein can be combined together or they can be combined with other embodiments without departing from the spirit of the present invention.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE INVENTION

Lee U.S. patent application Ser. No. 11/786,848, filed Apr. 12, 2007, entitled "METHOD FOR AUTOMATIC PRESENTATION OF INFORMATION BEFORE CONNECTION" is hereby incorporated by reference in its entirety.

Figure 1:
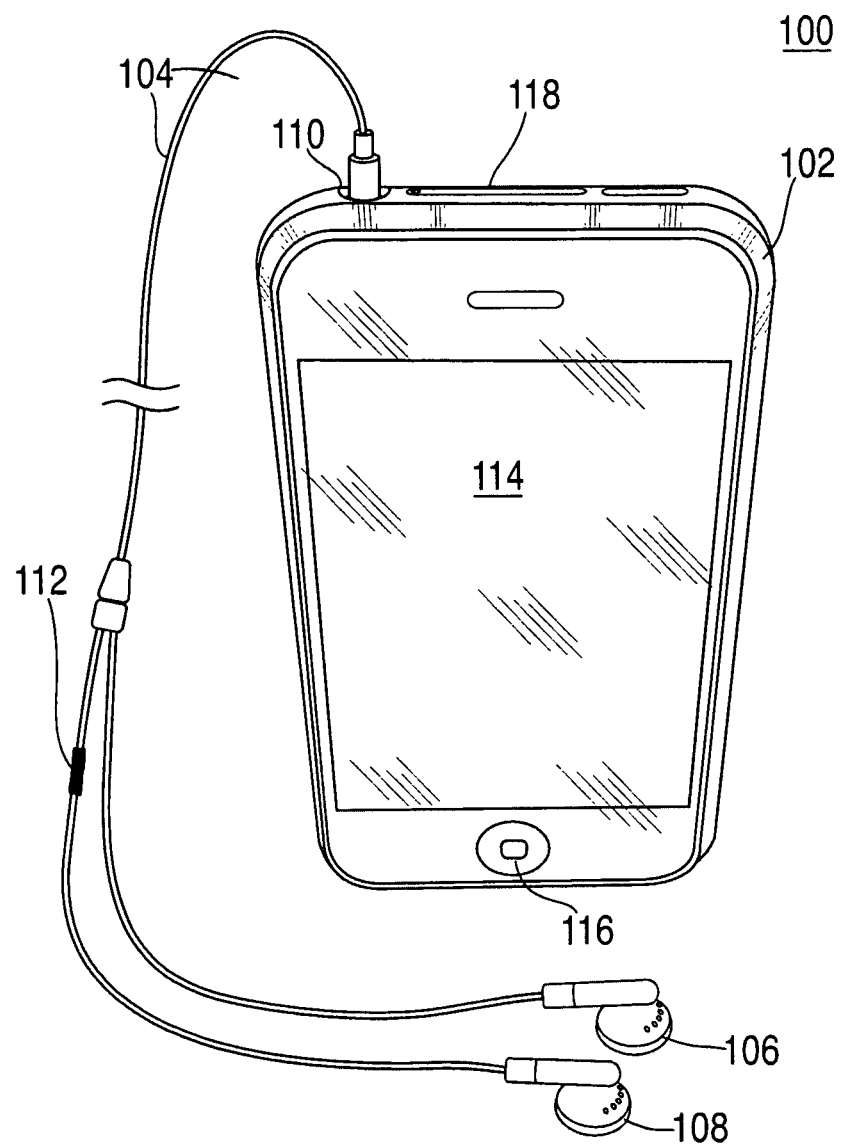
FIGS. 1 and 2 are illustrative systems that can operate in accordance with some embodiments of the present invention.

FIG. 1 shows a simplified diagram of communication device 100, which can be operated in accordance with the principles of the present invention. Communication device 100 may consist of, for example, a cellular phone which communicates over a cellular network to reach the second party. Additionally, communication device 100 may be a cellular phone which communicates through non-cellular network means, such as Voice Over Internet Protocol (VoIP) to reach a second party. As yet another embodiment, communication device 100 may be a landline telephone. In the present invention, communication device 100 may be operated by the user and/or the second party.

In some embodiments, communication device 100 may consist of media device 102 and one or more accessory devices 104. Accessory device 104 may be electrically coupled to media device 102 and may be removable from media device 102. Alternatively, accessory device may be wirelessly coupled to media device 102. Although only one instance of accessory device 102 is shown for simplicity, one skilled in the art would recognize that one or more instances of accessory device 104, with the same or varying functionalities, may be coupled to media device 102. Generally, any of the components of communication device 100 described below may be contained in media device 102 and/or contained in accessory device 104.

Referring again to FIG. 1, possible components for communication device 100 are illustrated. In some embodiments, accessory device 104 can include right and left earphones 106 and 108 which may be attached to media device 102 through headset jack 110. Alternatively, accessory device 104 may consist of only one of either earphone 106 or earphone 108. Additionally, although earphones 106 and 108 are illustrated as being contained in accessory device 104, earphones 106 and 108 may also be integrated into media device 102, for example, as one or more speakers. Alternatively, earphones 106 and 108 may be a wireless device.

Microphone 112 is illustrated in FIG. 1 as being integrated into the same accessory device 104 as earphones 106 and 108. However, microphone 112 may alternatively be contained in a different accessory device that is separate from earphones 106 and 108. In another embodiment, microphone 112 may be contained in media device 102 or it may be a wireless device.

Communication device 100, as illustrated, additionally includes display screen 114. Further to the discussion above, display screen 114 does not need to be integrated into media device 102, and in other embodiments may be an accessory to or wirelessly in communication with media device 102. For example, display screen 114 may be a television screen, a computer monitor, a graphical user interface, a textual user interface, a projection screen, or any combination thereof. Display screen 114 may present various types of information to the user such as graphical and/or textual information. This may include, for example, menu options, incoming/outgoing phone call information, stored videos, stored data, system information, messages received from second parties, etc. Additionally, display screen 114 may also function as a user input component that allows for a touch screen, user input via a stylus, etc.

Communication device 100 may also include user input component 116. User input component 116 may include one or more instance of, for example, buttons, switches, track wheels, click wheels, etc. Additionally, multiple means for connecting, for example, various accessories devices such as headset jack 110 may also be included. One skilled in the art would appreciate that, in addition to headset jack 110, one or more alternative connectors such as USB ports, 30-pin connector port, etc., could also be included in media device 102.

Communication device 100 may also have slot 118 for introducing external data and/or hard drives into communication device 100. For example, slot 118 may enable media device 102 to receive SIM cards, flash drives, external hard drives, etc. Although only a single slot 118 is illustrated in FIG. 1, in other embodiments communication device 100 could contain one or more instances of slot 118.

Figure 2:
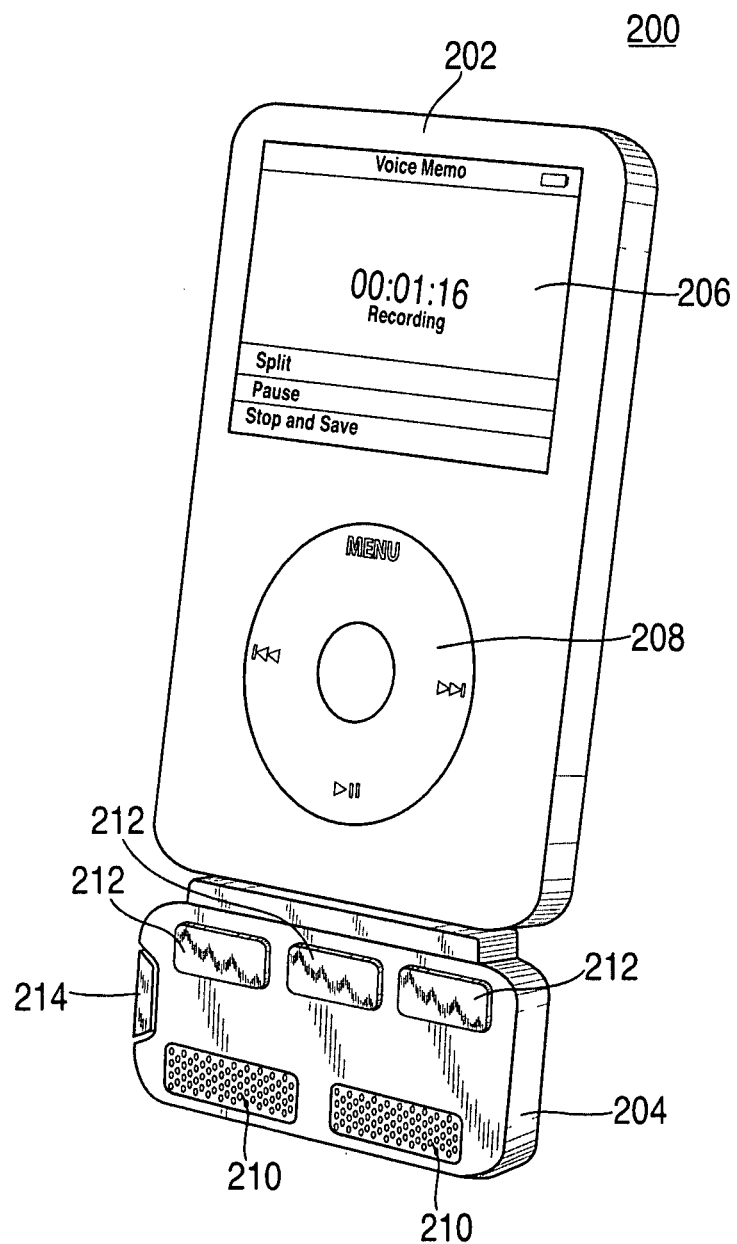

FIG. 2 shows a simplified diagram of computer system 200, which can be operated in accordance with the principles of various embodiments of the present invention. Computer system 200 may consist of, for example, a personal computer such as a desktop computer or a laptop computer. In another embodiment, computer system 200 may be personal data assistant (PDA) such as a Blackberry™. A user may operate computer system 200 to communicate with second parties through, for example, e-mail messages, SMS text messages, instant messaging such as AOL Instant Messenger™, program and/or components for audibly communicating over the Internet such as iChat™, etc. Computer system 200 may include, but is not limited to, any of the embodiments mentioned herein.

In some embodiments, computer system 200 includes media device 202 and accessory device 204. Media device 202 is shown as including display component 206 and user input component 208.

Display component 206 is illustrated in FIG. 2 as a display screen that is integrated into media device 202. Display component 206, like any other component discussed herein, does not have to be integrated into media device 202 and can also be external to media device 202. For example, display component 206 may be a computer monitor, television screen, projection screen, and/or any other graphical user interface, textual user interface, or combination thereof. Display component 206 enables media device 202 to playback the video portion of video content, and/or may serve as part of the user interface, etc.

User input component 208 is illustrated in FIG. 2 as a click wheel. One skilled in the art would appreciate that user input component 208 could be any type of user input device that is integrated into or located external to media device 202. For example, user input component 208 could also be a mouse, keyboard, trackball, slider bar, one or more buttons, electronic device pad, dial, or any combination thereof. User input component 208 may also include functionality that allows for a touch screen, user input via a stylus, etc.

Accessory device 204 can include components such as, for example, microphones 210, input buttons 212 and eject button 214. Microphones 210 can receive audio signals. Circuitry (not shown), which can be included in media device 202 and/or accessory device 204, can convert the audio signals into one or more audio data files. Buttons 212 can be used for user input and instructions. Eject button 214 can be used to decouple accessory device 204 from media device 202.

Although not shown, media device 202 and/or accessory device 204 may also include speakers for generating audio signals. Media device 202 and/or accessory device 204 may also include one or more connector ports such as headset jacks, USB ports, 30-pin connector port, etc. The connector ports may be utilized, for example, for electrically coupling computer system 200 with one or more accessory devices, power sources, for syncing with other computer systems, etc. Lastly, computer system 200 may also have one or more slots for introducing external data and/or hard drives into computer system 200. For example, computer system 200 may be able to receive SIM cards, flash drives, external hard drives, etc.

Accessory device 204 is shown in FIG. 2 as being physically and electrically coupled to media device 202 via a connector component (not shown). In other embodiments, accessory device 204 can be electrically coupled to media device 202 wirelessly. When accessory device 204 is coupled to media device 202, either or both devices may have enhanced functionality. This enhanced functionality may automatically occur in response to the devices being coupled together or in response to a user input. For example, accessory device 204 may not have its own power supply or display screen and only function when accessory device 204 is coupled to media device 202. As another example, specialized circuitry or applications (for, e.g., recording and converting audio signals) may only be included in accessory device 204 and not in media device 202. Accessory device 204 may also have, for example, limited storage capacity and have to utilize the storage component(s) of media device 202 to store audio data files.

Figure 3:
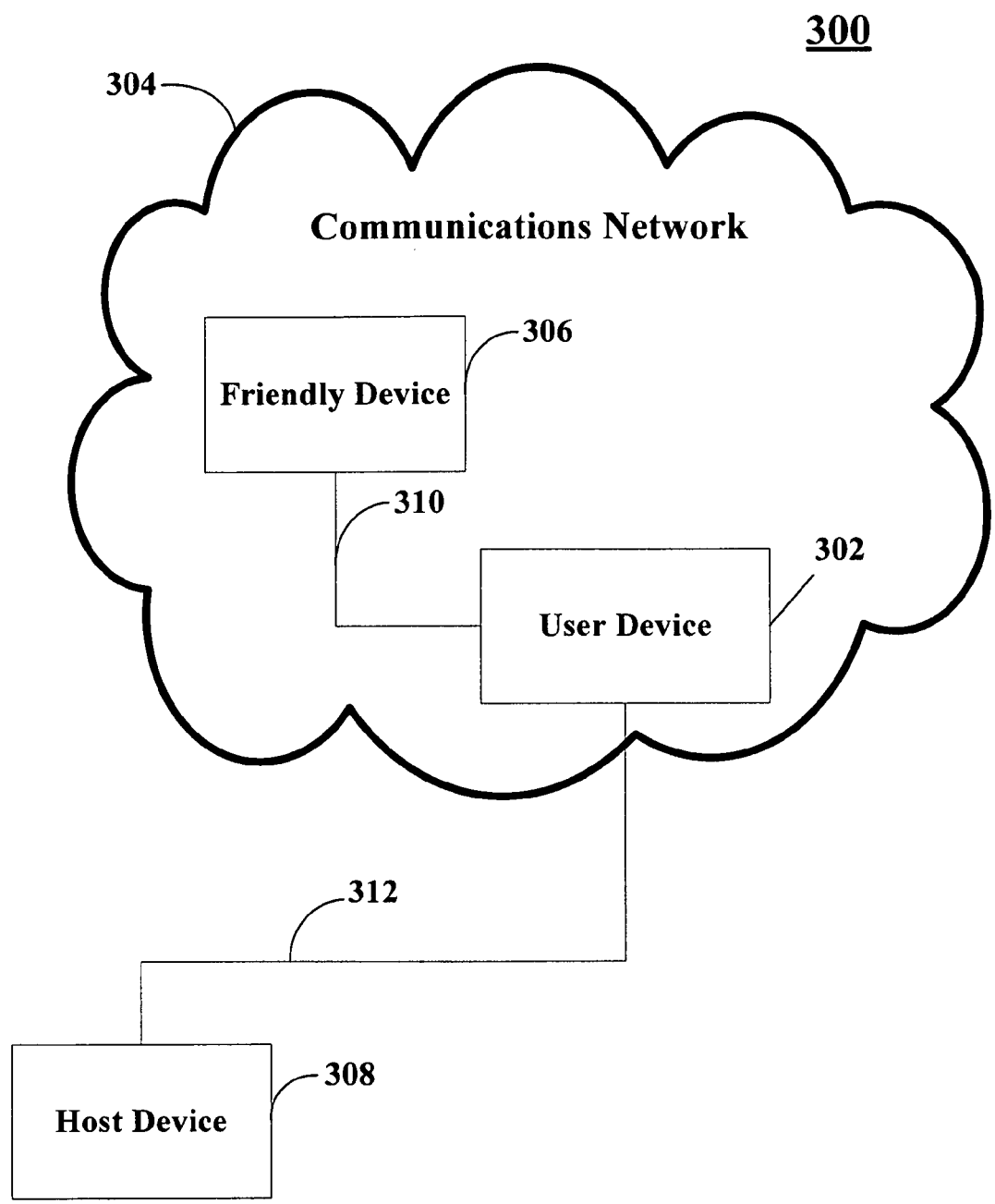
FIG. 3 is a schematic view of a communications system in accordance with one embodiment of the invention.

FIG. 3 is a schematic view of a communications system in accordance with one embodiment of the invention. Communications system 300 may include user device 302 and communications network 304, which user device 302 may use to perform wireless or wired communications with other devices within communications network 304. For example, user device 302 may communicate with one or more friendly devices 306. Friendly device 306 may include any electrical device, being utilized by a second party, with which user device 302 is facilitating communications. For example, user device 302 and friendly device 306 may be a cellular phone, a landline telephone, a PDA, a personal computer, etc.

In general, user device 302 and friendly device 306 may be any suitable device for sending and/or receiving communications (and need not be the same type of device). The communications sent and received may be any suitable form of communications, including for example, voice communications (e.g., telephonic communications), data communications (e.g., e-mails, text messages, media messages), or any combinations of these. Although communications system 300 may include several of user devices 302, friendly devices 306, and hosts 308, only one of each is shown in FIG. 3 to avoid overcomplicating the drawing.

Any suitable circuitry, device, system, or combination of these such as operative to create a communications network may be used to create communications network 304. For example, a wireless communications infrastructure including communications towers and telecommunications servers, etc., may be utilized to create communications network 304. Communications network 304 may be capable of providing wireless communications using any suitable short-range or long-range communications protocol. In some embodiments, communications network 304 may support, for example, Wi-Fi (e.g., an 802.11 protocol), Bluetooth™, high frequency systems (e.g., 900 MHz, 2.4 GHz, and 5.6 GHz communication systems), infrared, or any combination thereof. In some embodiments, communications network 304 may support protocols used by wireless and cellular phones and PDA's. Such protocols can include, for example, GSM, GSM plus EDGE, CDMA, quadband, and other cellular protocols. In another example, a long range communications protocol can include Wi-Fi and protocols for placing or receiving calls using VoIP or LAN. User device 302 and friendly device 306, when located within communications network 304, may communicate over a local wireless or wired communication path such as path 310.

In some embodiments, user device 302 or friendly device 306 may be coupled to host device 308 for data transfers, synching the communications device, software or firmware updates, or performing any other suitable operation that may require user device 302 and host device 308 to be coupled. In some embodiments, several user devices 302 may be coupled to host device 308 to share data using host device 308 as a server. In some embodiments, user device 302 may be coupled to several host devices 308. The multiple coupling may be used, for example, so that each of the plurality of host devices 308 can serve as a backup for data stored in user device 302.

User device 302 may be coupled with host device 308 over communications link 312 using any suitable approach. For example, user device 302 may use any suitable wireless communications protocol to connect to host device 308 over communications link 312. As another example, communications link 312 may be a wired link that is coupled to both user device 302 and host device 308. As still another example, communications link 312 may include a combination of wired and wireless links. Any suitable connector, docking station, etc., may be used to couple user device 302 and host device 308.

Figure 4:
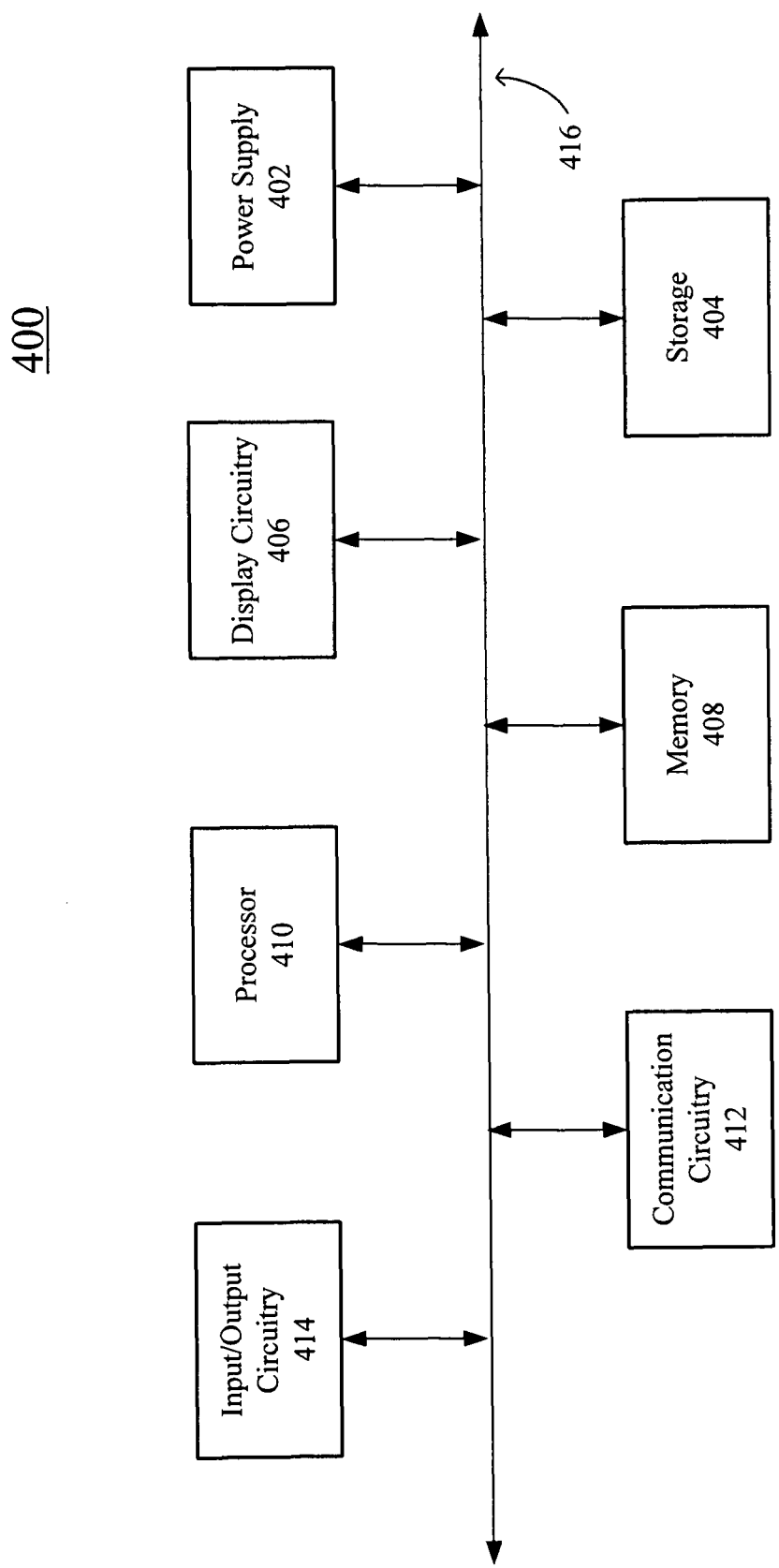
FIG. 4 is a simplified schematic block diagram of circuitry in accordance with some embodiments of the present invention.

FIG. 4 illustrates a simplified schematic diagram of an illustrative electronic device or devices in accordance with one embodiment of the present invention. Communication device 100 and computer system 200 are examples of systems that can include some or all of the circuitry illustrated by electronic device 400.

Electronic device 400 can include, for example, power supply 402, storage 404, display circuitry 406, memory 408, processor 410, communication circuitry 412, and input/output circuitry 414. In some embodiments, electronic device 400 can include more than one of each component of circuitry, but for the sake of simplicity, only one of each is shown in FIG. 4. In addition, one skilled in the art would appreciate that the functionality of certain components can be combined or omitted and that additional or less components, which are not shown in FIGS. 1, 2, and 4, can be included in, for example, systems 100, 200, or 400.

Power supply 402 can provide power to the components of device 400. In some embodiments, power supply 402 can be coupled to a power grid such as, for example, a wall outlet or automobile cigarette lighter. In some embodiments, power supply 402 can include one or more batteries for providing power to an electronic device. As another example, power supply 402 can be configured to generate power in an electronic device from a natural source (e.g., solar power using solar cells).

Storage 404 can be, for example, a hard-drive, flash memory, cache, ROM, and/or RAM. Additionally, storage 404 can be local to and/or remote from electronic device 400. For example, storage 404 can be integrated storage medium, removable storage medium, storage space on a remote server, wireless storage medium, or any combination thereof. Furthermore, storage 404 can store data such as, for example, system data, user profile data, and any other relevant data.

Display circuitry 406 can accept and/or generate commands for displaying visual information to the user on a display device or component, such as, for example, display 114 of FIG. 1 or display 206 of FIG. 2. Additionally, display circuitry 406 can include a coder/decoder (CODEC) to convert digital media data into analog signals. Display circuitry 406 also can include display driver circuitry and/or circuitry for operating display driver(s). The display signals can be generated by processor 410 or display circuitry 406. The display signals can provide media information related to media data received from communications circuitry 412 and/or any other component of electronic device 400. In some embodiments, display circuitry 406, like any other component discussed herein, can be integrated into and/or electrically coupled to electronic device 400.

Memory 408 can include any form of temporary memory such as RAM, buffers, and/or cache. Memory 408 can also be used for storing data used to operate electronic device applications.

Processor 410 can be capable of interpreting system instructions and processing data. For example, processor 410 can be capable of executing programs such as system applications, firmware applications, and/or any other application. Additionally, processor 410 has the capability to execute instructions in order to communicate with any or all of the components of electronic device 400.

Communication circuitry 412 may be any suitable communications circuitry operative to initiate a communications request, connect to a communications network, and/or to transmit communications data to one or more servers or devices within the communications network. For example, communications circuitry 412 may support one or more of Wi-Fi (e.g., a 802.11 protocol), Bluetooth™ (trademark owned by Bluetooth Sig, Inc.), high frequency systems, infrared, GSM, GSM plus EDGE, CDMA, other cellular protocols, VoIP, FTP, P2P, SSH, or any other communication protocol and/or any combination thereof.

Input/output circuitry 414 can convert (and encode/decode, if necessary) analog signals and other signals (e.g., physical contact inputs, physical movements, analog audio signals, etc.) into digital data. Input/output circuitry 414 can also convert digital data into any other type of signal. The digital data can be provided to and received from processor 410, storage 404, memory 408, or any other component of electronic device 400. Although input/output circuitry 414 is illustrated in FIG. 4 as a single component of electronic device 400, a plurality of input/output circuitry components can be included in electronic device 400. Input/output circuitry 414 can be used to interface with any input or output component, such as those discussed in connection with FIGS. 1-3. For example, electronic device 400 can include specialized input circuitry associated with input devices such as, for example, one or more microphones, cameras, proximity sensors, accelerometers, ambient light detectors, etc. Electronic device 400 can also include specialized output circuitry associated with output devices such as, for example, one or more speakers, earphones, LED's, LCD's, etc.

Lastly, bus 416 can provide a data transfer path for transferring data to, from, or between processor 410, storage 404, memory 408, communications circuitry 412, and any other component included in electronic device 400. Although bus 416 is illustrated as a single component in FIG. 4, one skilled in the art would appreciate that electronic device 400 may include one or more components of bus 416.

As mentioned above, the present invention is related to systems, apparatus and methods for providing message alerts to a user. The user device may provide the alerts to the user in many different embodiments, under different circumstances, and at different time instances.

According to some embodiments of the present invention, a user may be operating an electronic device, sometimes referred to herein as a "user device", to facilitate communications with a second party. The user device may be, for example, a cellular phone, a landline phone, a personal computer, a PDA, etc. The second party may also be operating an electronic device, sometimes referred to herein as a "friendly device", to receive the user's communications. Similar to the user device, the friendly device may also be any suitable communications device such as, for example, a cellular phone, a landline phone, a personal computer, a PDA, etc. To "facilitate communications" with the second party, the user device may send text-based messages such as, for example, e-mails, SMS text messages, instant messages, etc., to the friendly device. Alternatively, the user device may send audible messages, such as voicemail, to the friendly device. In yet another embodiment, the user may desire to have a real time conversation with the second party. In this case, the user device may, for example, connect to the friendly device over a cellular network, connect over a VoIP network, connect through a computer software based system such as iChat™, etc.

Figure 5:
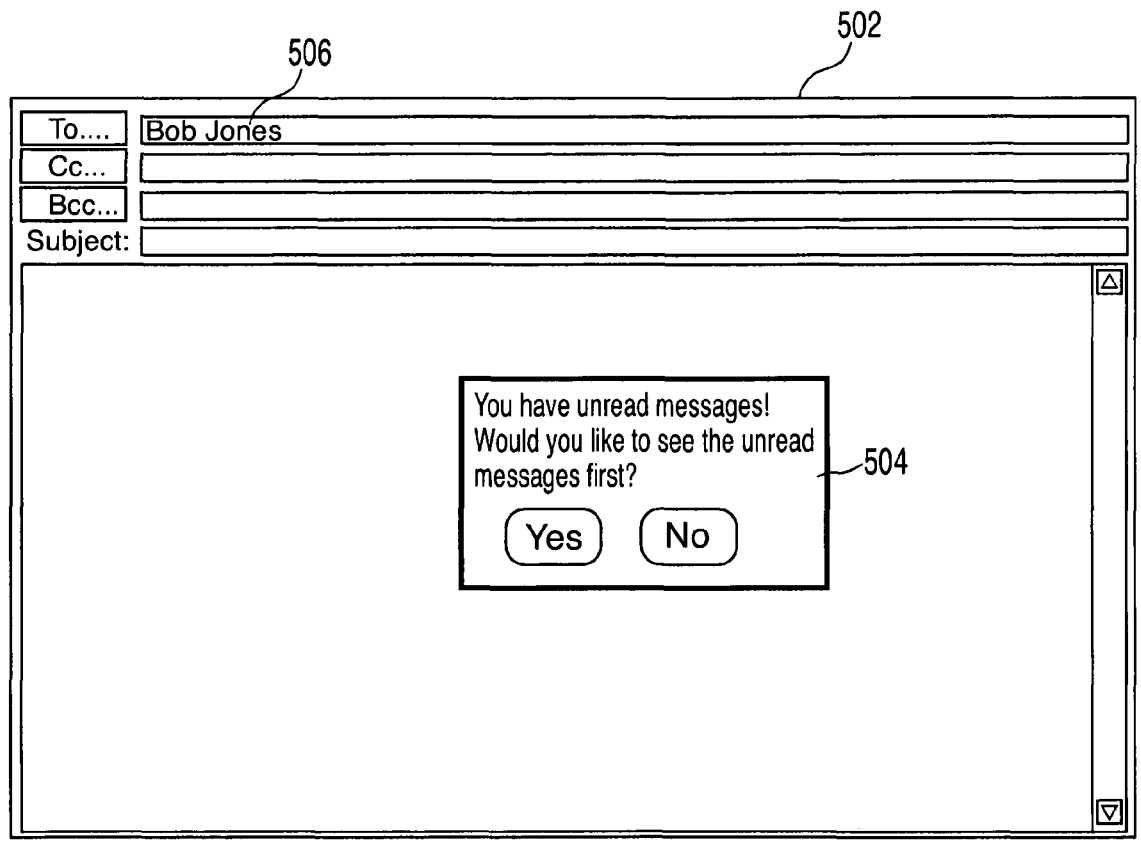
FIGS. 5-9 are depictions of representative interactive user interface displays according to some embodiments of the present invention.

In one embodiment, the user may be in the process of initiating communications with a second party. For example, as illustrated in FIG. 5, the user device may be attempting to send an e-mail to a second party in which case, an e-mail creation window can be displayed, such as window 502. In this instance, however, after e-mail window 502 has been opened and an address has been added by the user, the user device can inform the user that there are unread messages through one of various ways, such as prompt window 504. Prompt window 504 can give the user the option to view one or more unread message that have been received from the addressee of the outgoing e-mail. In another embodiment, the user is given the option of reviewing messages, read or unread, from the addressee. In still another embodiment, any unread messages from the addressee can be displayed to the user automatically (see FIG. 6 described below).

In addition to open e-mail window 502, "initiating communications" with a second party may be carried out through other methods of communication. For example, an open SMS text message window on any suitable device such as, for example, a cellular phone, PDA, personal computer, etc., may signify that the user device is initiating communications with a second party. In another embodiment, the user device may initiate audible communications through connecting to a cellular network, connecting to a VoIP network, etc. In yet another embodiment, an open instant messaging window, such as those utilized by AOL Instant Messenger™, may signify that the user device is initiating communications with a second party.

The alert prompt may be delivered to the user in various ways and may include alerts for any suitable form of message, sometimes related to herein as "alert content". For example, the alert content may include unread email messages, unread SMS text message, unread instant messages, unheard voicemails, etc. In other embodiments, the alert content may also include the option to read email messages, read SMS text message, read instant messages, open voicemails, etc.

The user device may also deliver the alert prompt to the user audibly, textually, visually, and/or haptically. For example, if the user is operating a cellular phone to make a telephone call, the user device may deliver an audible alert prompt to the user. The audible alert prompt may be, for example, a recording or a computer-generated audio informing the user of the unopened messages, a tone to alert the user to the presence of unopened messages, etc. Alternatively, prior to sending a message or finalizing a telephone call, the user device may vibrate and/or provide visual cues if alert content is available. Visual cues may include, for example, an actable LED, a symbolic icon, One skilled in the art would appreciate that the present invention is not limited to the embodiments described above. Rather, any suitable user device, friendly device, communication form, etc., suitable for use in communication systems may be utilized. Additionally, any combination of the above user devices, friendly devices, alert content, and/or alert prompts may be combined in the present invention. Additionally, although the alert prompt is illustrated as appearing after a second party name 506 has been designated, the alert prompt may appear at other times in the embodiment illustrated by FIG. 5 (and, for example, in the embodiments illustrated by FIGS. 6-8). For instance, the alert prompt may appear after designating a subject, after an e-mail/SMS text message has been completed, while a user is composing the main body of an e-mail/SMS text message, prior to placing a telephone call but after designating a second party phone number, while a cellular phone is connecting to a cellular phone network but before successfully connecting to the second party, etc.

Figure 6:
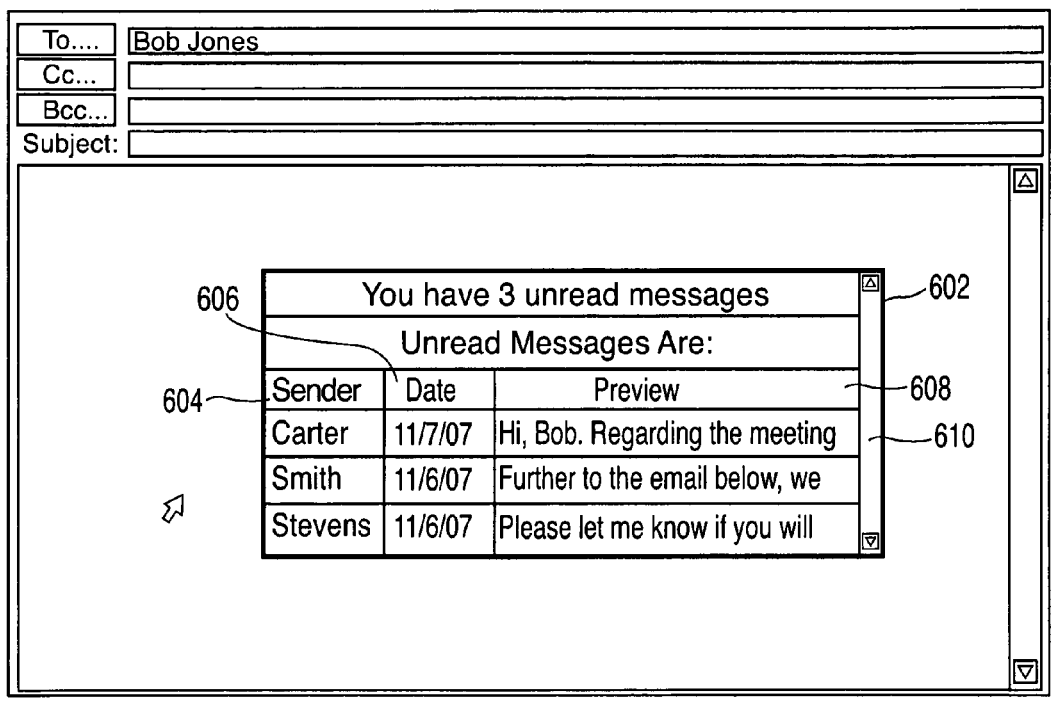

As illustrated by FIG. 6, the user device may additionally provide the user with alert content automatically without prompting the user for instructions. In this embodiment, when the user is initiating communications with a second party, the user device automatically generates alert window 602 if there is alert content. The user device may present the alert content graphically, textually, and/or audibly. For example, if the user has unheard voicemails, the voicemails may be presented to the user in the form of an audio file, or the user device may perform voice-to-text conversion on the voicemails and present the messages to the user in textual form.

Alert window 602 may have several embodiments. For example, alert window 602 may display a preview of all forms of alert content. Alternatively, alert window 602 may display a preview for only certain types of alert content. For example, alert window 602 may contain only e-mail messages, only SMS text messages, only voicemail messages, only a combination of voicemail and e-mail messages, any combination of the above, etc. FIG. 6 illustrates alert window 602 as displaying the sender 604, the date 606, and a preview 608 of the alert content. Alternatively, alert window 602 may contain any combination of one or more senders, sender contact information (for example, as retrieved from an address book accessible by the user device), receivers, carbon copy (cc) receivers, blind carbon copy (bcc) receivers, dates, times, phone numbers, subject lines, previews, etc. In another embodiment, alert window 602 may show the entire content of each message, rather than showing a concatenated preview of the alert content. Alert window 602 may additionally contain scroll bar 610 to allow the user to scroll through all available alert content.

Figure 7:
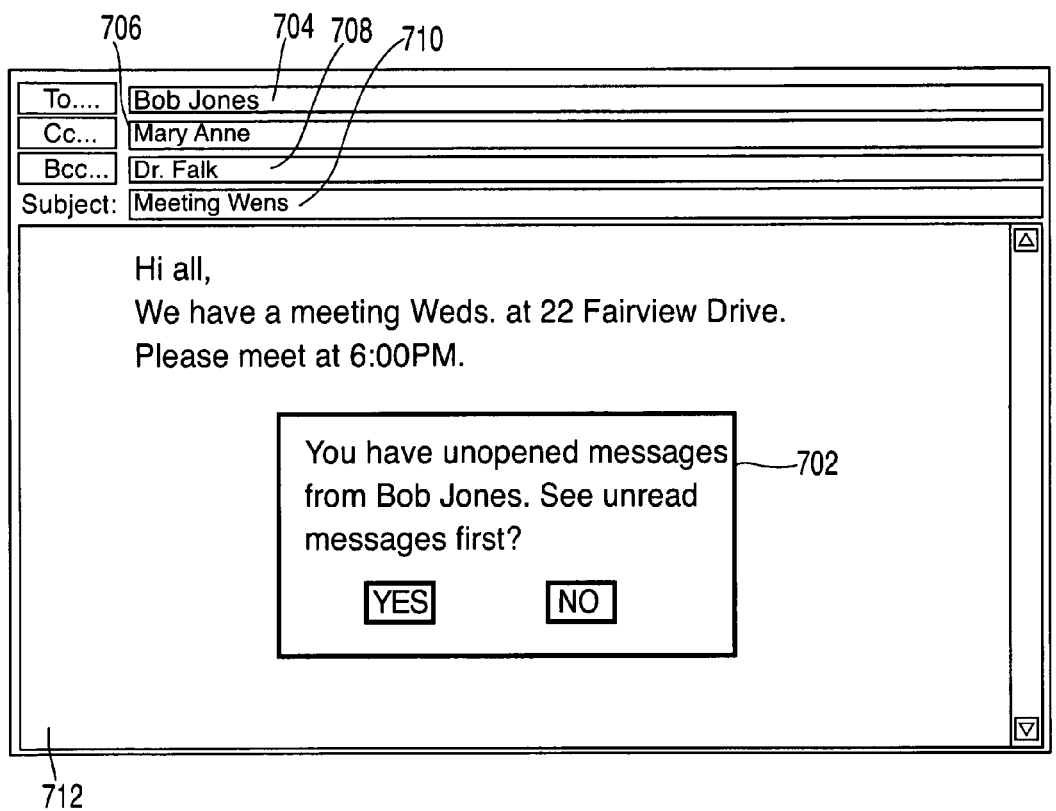

FIG. 7 illustrates another embodiment wherein the user device generates an alert prompt based on certain keyterms (these keyterms can include, for example, the second party contact information described above, and/or additional information). The user device utilizes the keyterms to choose the specific alert content, whether the alert content is an opened and/or unopened message. For example, the alert content may be read/unread e-mail messages, read/unread SMS text messages, heard/unheard voicemail messages, read/unread instant messages, etc., but the alert can be triggered once the user begins to enter content through the input of the device.

In one embodiment illustrated by FIG. 7, the keyterm may be message recipient 704. The user device may receive the keyterm (in this illustrative example, "Bob Jones") and then may locate any opened and/or unopened alert content from entities matching or related to the keyterm. As illustrated by FIG. 7, the user device has located all unopened messages received from "Bob Jones". Furthermore, the user device may have additionally or alternatively located all opened alert content received from Bob Jones. In another embodiment, the user device may have located all opened and/or unopened alert content with subject matter relating to Bob Jones. The user device may then prompt the user to determine if he would like to receive the alert content. As mentioned previously, alert content may include one or more of e-mail messages, SMS text messages, voicemails, instant messages, etc.

In other embodiments, the keyterms may include items apart from email recipient 704. For example, the user device may receive keyterms from carbon copy (cc) 706, blind carbon copy (bcc) 708, subject line 710, a second party phone number, contact information related to e-mail recipient 704 or a second party phone number (for example, as retrieved from an address book accessible by the user device), any combination of the above, etc. Additionally, the user device may derive keyterms from main body 712 or subject line 710. The methods for deriving keyterms will be discussed in greater detail in the descriptions to follow.

Figure 8:
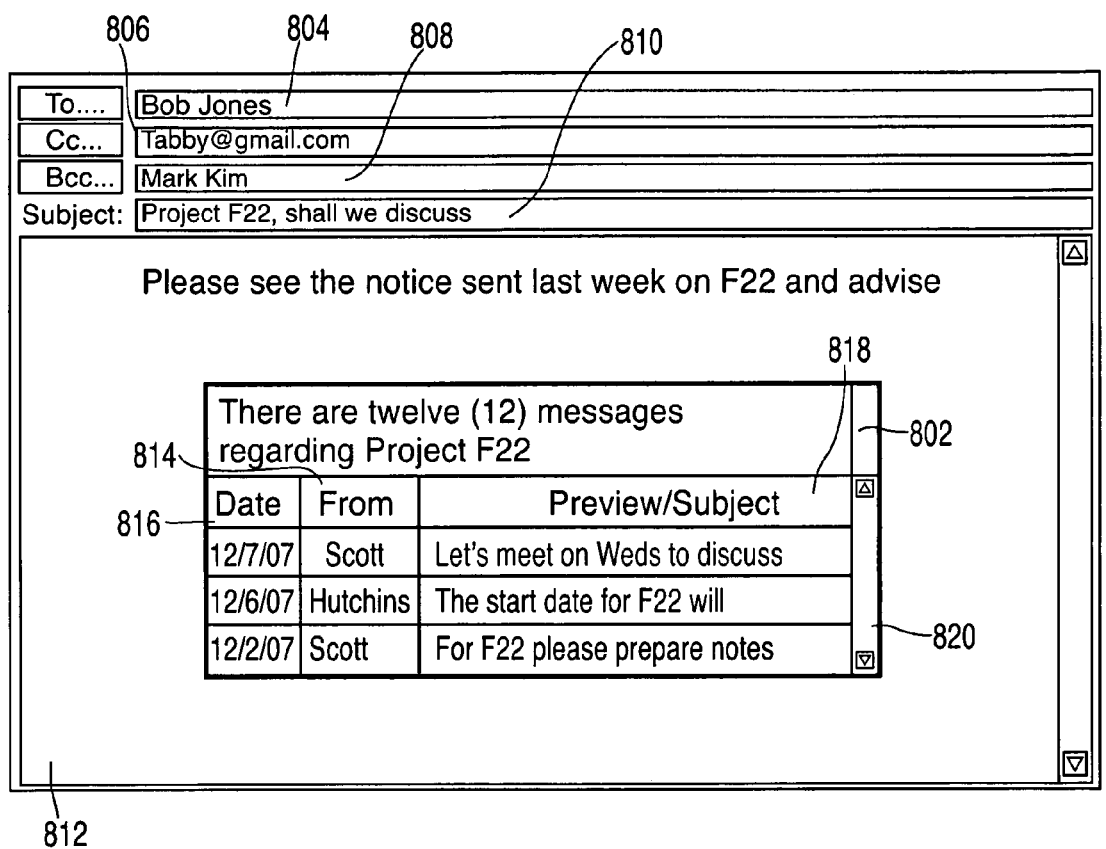

In a manner similar to that shown in FIG. 6, FIG. 8 illustrates an embodiment in which the user device may automatically provide alert content to the user. However, rather than only locating unopened messages, the user device in FIG. 8 may locate alert content based on keyterms. Once again, the keyterms may be related to message recipient 804, carbon copy 806, blind carbon copy 808, subject line 810, a second party phone number, contact information related to e-mail recipient 804 or recipient a second party, derived from main body 812, or any combination of the above.

Also similar to FIG. 6, the user device may display the alert content in FIG. 8 in varying embodiments. For example, alert window 802 may display a preview of all forms of alert content. Alternatively, alert window 802 may display a preview for only certain types of alert content. For example, alert window 802 may contain only e-mail messages, only SMS text messages, only voicemail messages, combination of voicemail and e-mail messages, any combination of the above, etc. FIG. 8 illustrates alert window 802 as displaying the message sender 814, the date 816, and a preview 818 of the alert content. Alternatively, alert window 802 may contain any combination of one or more message senders, sender contact information, message receivers, carbon copy (cc) receivers, blind carbon copy (bcc) receivers, dates, times, phone numbers, subject lines, previews, etc. In another embodiment, alert window 802 may show the entire content of each message, rather than showing a concatenated preview of the alert content (or the entire content can be presented to the user after the user selects a message from the information displayed, for example, in FIG. 8). Alert window 802 may additionally contain scroll bar 820 to allow the user to scroll through all available alert content.

Figure 9A:
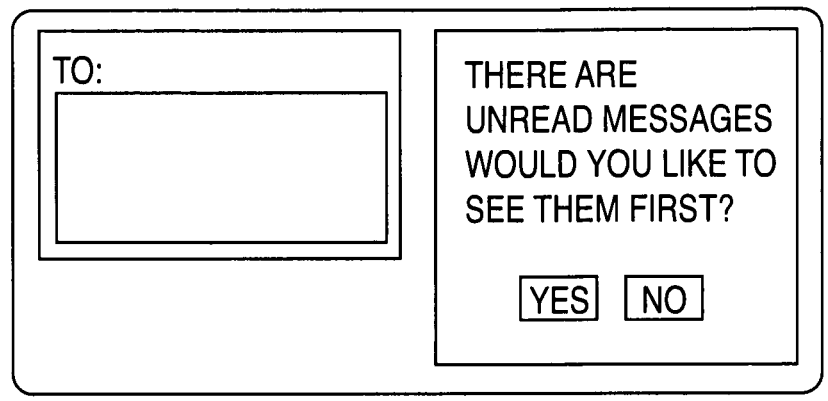
Figure 9B:
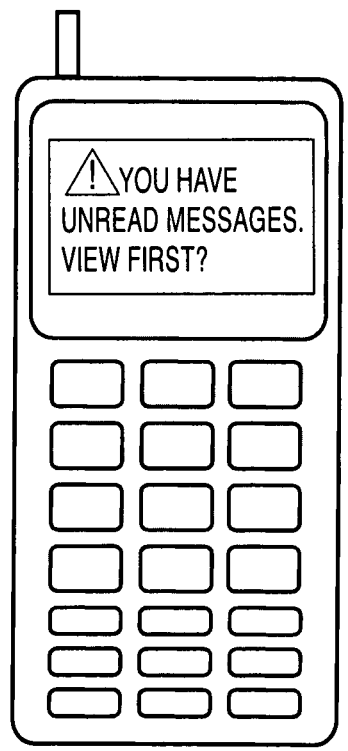

Furthermore, although FIGS. 5-8 illustrate prompt windows 504 and 702 and alert windows 602 and 802 as being superimposed on top of a message window, windows 504 and 702 and alert windows 602 and 802 may have alternative locations. For example, the windows may be non-overlapping a message window, non-overlapping any other content (as illustrated by FIG. 9A), superimposed on top of and partially obscuring the current display, completely filling an entire display, etc. Prompt windows 504 and 702 and alert windows 602 and 802 may also appear in any suitable user device such as, for example, a cellular phone display (as illustrated in FIG. 9B), a PDA display, a personal computer display, etc. Rather than presented to the user in visually form, the contents of prompt windows 504 and 702 and alert windows 602 and 802 may additionally be presented to the user audibly, for example, as computer generated or recorded speech.

Various embodiments of the present invention may additionally allow a user to configure the system through user configuration settings. For example, the user configuration settings may determine if the user device displays an alert prompt prior to delivering alert content or if the user device automatically delivers alert content. In another embodiment, the user configuration settings may determine what types of alert content are chosen by the user device. For example, the settings may configure the user device to display opened and/or unopened e-mail messages, SMS text messages, voicemail messages, instant messages, or any combination of the above as alert content.

In yet another embodiment, the user configuration settings may determine when the user device delivers the alert prompt or the alert content. For example, depending on which embodiment of the user device is being utilized, the alert prompt/content may be delivered after the user chooses a phone number to call, after a user device has begun calling a phone number but before the connection with the friendly device is completed, after a user enters a recipient in an e-mail/SMS text message, after a user enters a subject in an e-mail/SMS text message, while a user is entering a subject in an e-mail/SMS text message, while a user is entering the main body of an e-mail/SMS text message, after a user chooses to send an e-mail/SMS text message but before the user device has sent the message, etc.

In another embodiment, the user configuration settings may determine how the user device chooses keyterms. For example, the user device may choose a keyterm to be the message recipient in an e-mail or SMS text message (i.e., message recipient 704 of FIG. 7), the phone number being called, cc's or bcc's of an e-mail or SMS text message, the recipient of an instant messaging conversation, any combination of the above, etc. The user device may then process these keyterms and search for related alert content. For example, the user device may search for messages received from second parties whose identity matches the message recipients.

Additionally, the user device may access a local or external address book to locate additional keyterms. For example, if a keyterm is the user-designated message recipient, "John Smith", the user device may access an address book contained in, for example, an electrically coupled personal computer, PDA, cellular phone, etc. The user device may then search the address book for the keyterm, "John Smith", to find additional keyterms. For example, the user device may find a data entry for this keyterm which records that John Smith is related to the e-mail address "John.Smith@mail.com". The user device may then add "John.Smith@mail.com" to the keyterms that may be used for locating alert content. The user device may then locate any e-mails, SMS text messages, voicemails, instant messages, etc., received from John.Smith@mail.com and John Smith, and store these messages as alert content.

The user device may additionally derive keyterms from content such as, for example, SMS text message main bodies, e-mail subject lines, and/or e-mail main bodies. For example, to locate keyterms the user device may search for terms which appear multiple times in an e-mail/SMS text message main body. The user device may also utilize a weighting scale to determine how relevant or important a keyterm is. For example, the more instances of a keyterm there are in the main body, the greater that keyterm may be weighted. Furthermore, a keyterm may be given an even greater weight if that keyterm additionally appears in the subject line. Furthermore, as a user is composing an e-mail/SMS text message main body or subject line, the user device may "auto-filter" the user's text to continuously derive additional keyterms, update current keyterms (for example, update the weighting scale on an already existing keyterm), and locate new alert content. Thus, the user device may generate an alert window which automatically updates and filters alert content as the user is composing a message.

The user may additionally utilize the user configuration settings to determine how the alert content is sorted. For example, the settings may determine if the user device sorts the alert content by message sender, message receiver, cc, bcc, phone number, date, time, subject, size, number of words, priority, etc.

Illustrative flow chart diagrams which represent various embodiments for delivering message alerts in accordance with the present invention are shown in FIGS. 10-14. Each embodiment may begin with process 1000 at starting point 1002 and, after intermediate steps, may progress to point A 1020. Depending on the type of communication being initiated, the process may then proceed to point A of FIG. 11, FIG. 13, or FIG. 14. For example, if a phone call is being placed over a cellular network, over a VoIP network, over a landline telephone network, through a computer based system such as iChat™, or through any suitable method for utilizing a user device to audibly communicate with a second party, then the process may proceed to point A 1102 of FIG. 11. In another embodiment, if communication is being initiated through the sending of text-based messages to a second party such as, for example, sending e-mail messages, sending SMS text messages, etc., then the process may proceed to point A 1302 of FIG. 13. As another embodiment, if real time text-based messages are being delivered to the second party through, for example, AOL Instant Messenger™, Windows® Messenger, etc., then the process may proceed to point A 1402 of FIG. 14.

Process 1000 begins at starting point 1002 and progresses to step 1004. In step 1004, the process waits until the user device receives a request to facilitate communications with a second party. As mentioned above, a request to "facilitate communications" with the second party may include, in one embodiment, a request to send text-based messages. The text-based messages may consist of e-mails, SMS text messages, etc. Alternatively, the request to facilitate communications with a second party may include a request to send audible messages, such as a voicemail. As yet another example, the request may be to facilitate a real time conversation between the user and the second party. In this case, the request may be for the user device to, for example, connect to the friendly device over a cellular network, connect over a VoIP network, connect through a computer software based system such as iChat™, connect through an instant messaging client, etc.

In response to the user device receiving a request to facilitate communications with a second party, in step 1006 the user device may then receive the second party information. Depending on the embodiment of the user device, the second party information may be, for example, one or more phone numbers, second party speed dial numbers, second party names, second party e-mail addresses, second party screennames (i.e., AOL Instant Messenger™ screenname, iChat™ screenname, etc.), any combination of the above, etc. Additionally, the second party information may be received in an audio format, for example, when a user voice dials a second party.

After receiving the second party information, the user device may then store the second party information as keyterms in step 1008. The data may be stored, for example, in memory 408 or storage 404, as described above. Prior to storage, the user device may encode, decode, digitize, or in any other suitable way preprocess the second party data. For example, if the second party data consists of an audio file generated in response to the user voice-dialing a second party, then the user device may first perform voice-to-text conversion on the audio file. The data may then be stored as keyterms, which will subsequently be used for locating alert content.

The process may then proceed to step 1010 to determine if user configuration settings are available. As mentioned previously, user configuration settings are provided by the user and can be utilized to set up and configure the user device. For example, user configuration settings may determine if the user device delivers an alert prompt prior to delivering alert content, if the user device automatically delivers alert content without providing an alert prompt, what forms of alert content are located by the user device, when during the message alert process the user device delivers the alert prompt/content, etc.

In response to user configuration settings being input by the user, the user device may then store the user configuration settings as "preferences" in step 1012. The preferences may be used later in the process (or in subsequent processes) to determine what types of alert content the user device may locate. For example, the preferences may determine that the user device locates e-mail messages, SMS text message, voicemail messages, instant messages, any combination of the above, etc. for deliver to the user. If, however, user configuration settings have not been defined, the process proceeds to step 1014 and stores the existing, default settings as the preferences.

After step 1014 or 1012, the process may proceed to step 1016. In step 1016, the process determines if more contact information relating to the second party contact data is available. For example, the user device may search for address book data in any local or external components which are electrically coupled to the user device. If address book data is available, the user device may then search the address book data to locate any additional contact information related to the second party data. As one example, the user device may receive a second party's e-mail address as contact information. The user device may then locate address book data, search the address book data for the second party's e-mail address, and search in the address book data for more contact data linked to that e-mail address. In the address book data, the user device may locate, for example, names, additional e-mail addresses, phone numbers, screennames, etc., which belong to the same party as the second party data.

In response to more contact information being available, the process may proceed to step 1018 and store the additional second party contact data as one or more additional keyterms. After storing the additional keyterms, the process proceeds to point A 1020. In response to no additional contact information being available, the process may directly proceed to point A 1020 without storing additional keyterms which are based on address book data.

Figure 10:
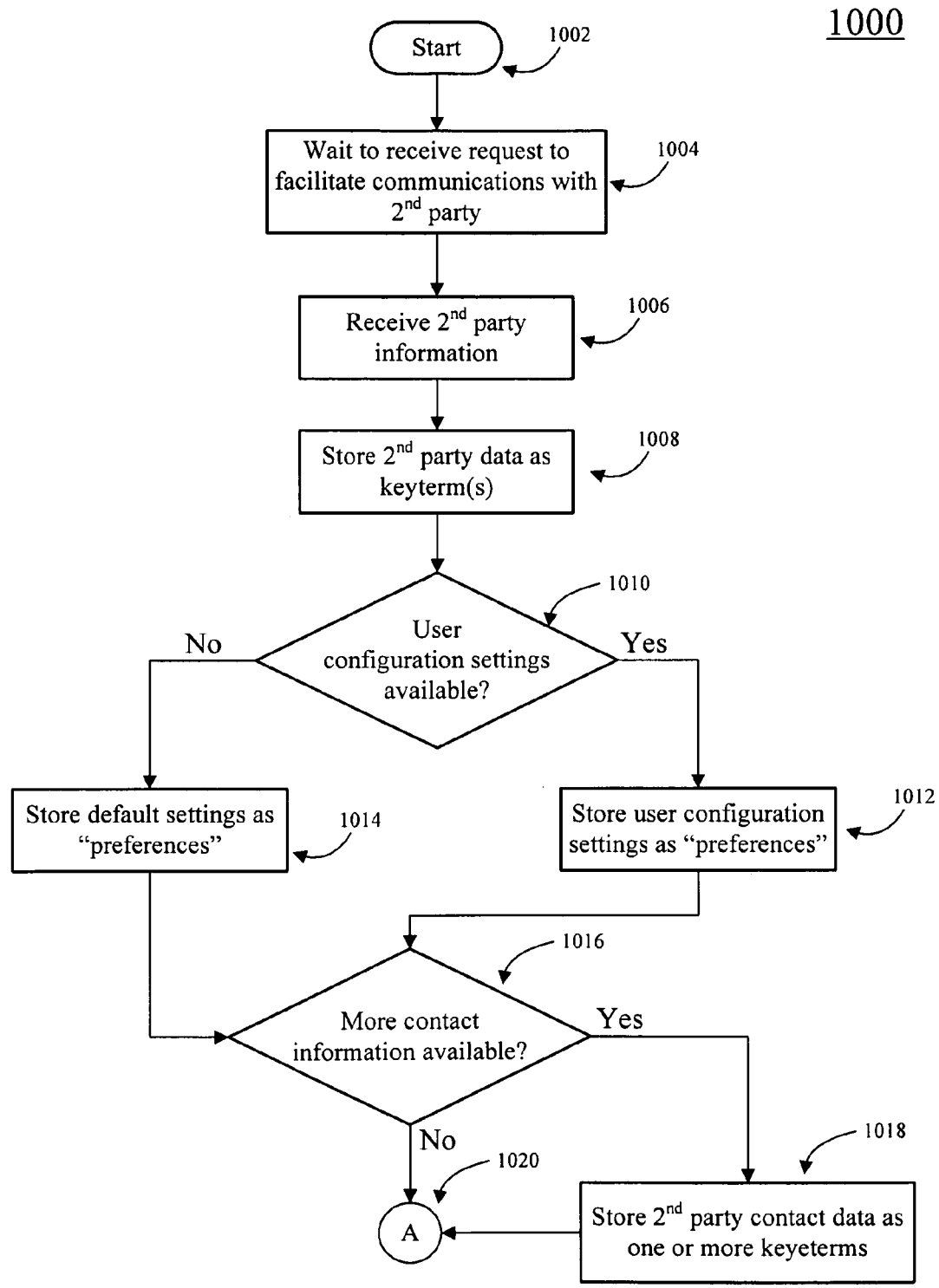
FIGS. 10-14 are simplified logical flow diagrams of illustrative modes of presenting message alerts in accordance with some embodiments of the present invention.
Figure 11:
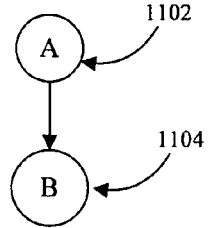
Figure 12:
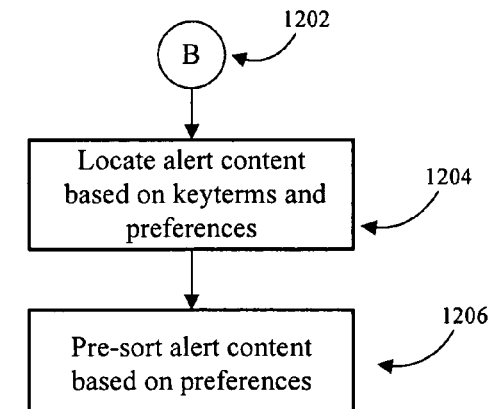

FIG. 11 shows process 1100. Process 1100 may proceed if a user device is initiating audible communications with a second party (is making a phone call to a second party). For example, a cellular phone communicating over a cellular network, a cellular phone communicating over a VoIP network, a landline telephone communicating over telephone lines, a computer device communicating through speech software such as iChat™, etc., may all utilize process 1100. Process 1100 may bring process 1000 of FIG. 10, which ends in step 1102, directly to process 1200 of FIG. 12, via step 1104, without any intermediary steps (As will be described later, this is in contrast to process 1300 of FIG. 13 which does consist of intermediary steps between process 1000 and process 1200).

Process 1200 initiates at point B 1202 and then may proceed to step 1204. In step 1204, the user device may locate alert content based on keyterms and preferences. The keyterms were stored previously in step 1008 and step 1018 of process 1000 of FIG. 10. The preferences were derived and stored from the user configuration settings in step 1012 or from the system default settings in step 1014 of FIG. 10.

The user device may locate potential alert content by searching for messages which are related to the keyterms. For example, if a keyterm contains the second party's e-mail address, the process may locate any e-mails received from the second party's e-mail address. As another example, if the keyterm contains the second party's phone number, the process may locate any voicemails and/or SMS text messages received from the second party's phone number, etc. Additionally, the process may employ the preferences to further determine what alert content the user device locates and delivers to the user. For example, the preferences may direct the user device to locate only opened messages, unopened messages, e-mails, text messages, voicemail messages, voicemail messages which have been converted to text, any combination of the above, etc.

In step 1206, the process may pre-sort the alert content, based on the preferences, prior to displaying the alert content to the user. The preferences may have been derived from the user configuration settings in step 1012 or from the system default settings in step 1014 of process 1000. For example, as mentioned previously, the preferences may determine if the user device sorts the alert content by message sender, message receiver, cc, bcc, phone number, date, time, subject, size, number of words, priority, etc.

In step 1208, process 1200 prompts the user whether he would like to see the alert content which was located in the previous steps. However, one skilled in the art would appreciate that the process discussed herein may be modified, added to, and/or rearranged without departing from the scope of the invention. In particular, rather than first prompting the user, process 1200 may skip step 1208, proceed directly to step 1214, and automatically provide the alert content to the user without first prompting the user.

In response to the user device receiving instructions not to deliver the alert content, the process proceeds to step 1210 and finalizes the communication request. For example, if a cellular phone was being employed by the user to initiate communications with a friendly device, then the cellular phone proceeds to place the call and connects to the friendly device in step 1210. However, if the user device is instructed to deliver the alert content, then the process proceeds to step 1214.

In step 1214, the user device delivers the alert content to the user. The alert content may be delivered, for example, through display circuitry 406 to display screen 114 or display component 206 as textual and/or graphical information. For example, FIGS. 6 and 8 are illustrative embodiments of two manners in which the user device may deliver the alert content as textual and/or graphical information. As another embodiment, the user device may deliver the alert content through input/output circuitry 414 to, for example, earphones/speakers 106 and 108 as audio information.

In step 1216, the process checks to see if the user device has received a sort request. The user device may receive a sort request if, for example, the user chooses to view the alert information sorted by content such as message sender, message receiver, cc, bcc, phone number, date, time, subject, size, number of words, priority, etc. In response to the user device receiving a sort request, the process proceeds to step 1218 and sorts the alert content as requested. For example, the user device may sort the alert content alphabetically by the name of the message sender, chronologically by the date, numerically by the phone number, etc.

After the user device has completed sorting the alert content, the sorted alert content is delivered to the user. Once again, the user device may deliver the alert content through, for example, display circuitry 406 to display screen 114 or display component 206 as textual and/or graphical information. Alternatively, the user device may deliver the alert content through, for example, input/output circuitry 414 to earphones/speakers 106 and 108 as audio information. Typically, if the alert content is delivered graphically and/or textually, the sorted alert content may be delivered in place of the previously displayed alert content. In this manner, only the new, sorted alert content may be available for the user to view.

After the sorted alert content is delivered to the user, the process continues to step 1222 and waits for the user. In this step, the user is allowed to view/hear the alert content, manipulate the alert content (i.e., through sorting), and otherwise stall the processes until the user has sufficiently viewed/heard the alert content and is satisfied to continue. Additionally, although step 1216 (receiving a sort request) is illustrated as occurring directly before step 1222 (wait for user), one skilled in the art would appreciate that step 1216 may additionally occur concurrently with step 1222. For example, the user may choose to sort the alert content several times and by several different categories while the process is waiting for the user in step 1222. Each time a sort request is received by the user device, steps 1218-1220 are executed.

When the user indicates that the sorting is complete, the process proceeds to step 1224. The user may signify actions should be continued such as, for example, closing or minimizing a display window containing the alert content, typing an "end" button on a cellular phone, Blackberry™, or any suitable user device, otherwise pressing a key on an input component can indicate that the user has finished. In step 1224, the user device may prompt the user to determine whether the user would like to proceed with the original communication request, as received in step 1004 of FIG. 10. For example, the user device may prompt the user whether the phone call should be completed and to attempt to connect the user to the second party, complete sending an e-mail message, complete sending an SMS text message, etc.

In response to the user requesting not to proceed with the communication request, the process ends. This scenario can occur when, for example, the user had intended to ask the second party a certain question. However, upon receiving the alert content, the user can preemptively find that the answer to the question already exists in the alert content. In that case, the user may no longer find it necessary to communicate with the second party, and at step 1224 instructs the user device not to proceed with finalizing the communication request. The process may then proceed to step 1212 and end. If however, the user device receives a command to proceed with the communication, then the communication request is finalized in step 1210. This may consist of, for example, placing a phone call by connecting to the second party over a cellular network, placing a phone call by connecting to the second party over a VoIP network, sending an e-mail message to the second party, sending an SMS text message to the second party, etc.

Figure 13:
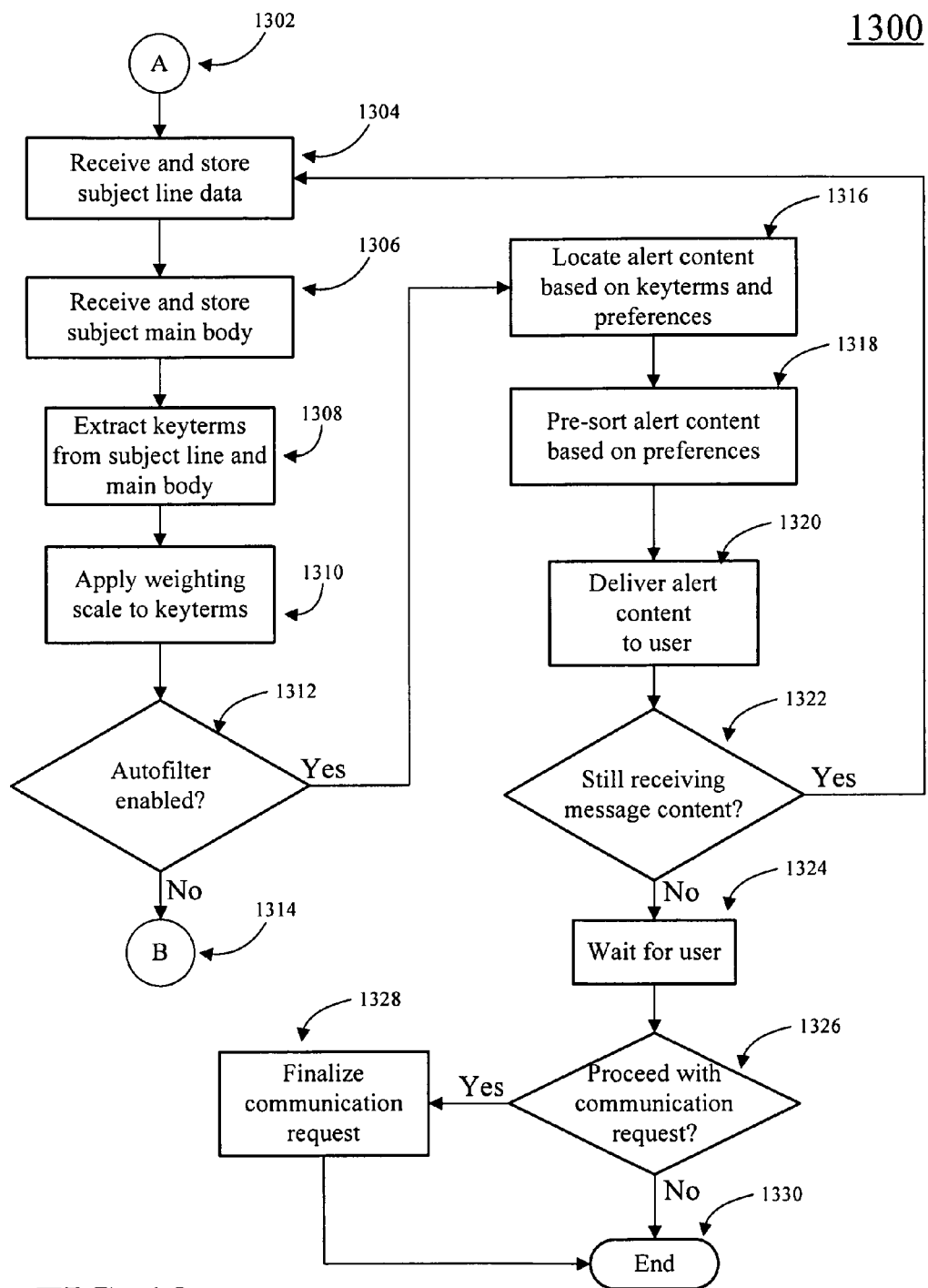

When process 1000 of FIG. 10 completes at point A 1020, the process may alternatively proceed to point A 1302 of FIG. 13 rather than to process 1100. Process 1300 may proceed when the user is facilitating communications with a second party by sending text-based messages such as, for example, e-mail messages, SMS text messages, etc.

In step 1304, the user device may receive and store subject line data such as, for example, data from subject line 710 of FIG. 7 or subject line 810 of FIG. 8. The user device may receive the data, for example, when the user enters subject line data into the message through an input device such as a keyboard, a mouse, a touchscreen, etc. The subject line data may be stored in any suitable data storage component, for example, memory 408 or storage 404.

In step 1306, the user device may receive and store main body data such as, for example, data from main body 712 of FIG. 7 or main body 812 of FIG. 8 (persons skilled in the art will appreciate that the user may leave the subject line blank and begin to enter information into the main body, in which case step 1304 would be skipped; however, in one embodiment of the present invention, the system can recognize when the user enters subject information and return to step 1304, or a similar step, at that time). Similar to step 1304, the user device may receive the main body data when the user employs an input device to enter main body data into the message. In one embodiment, the user device may receive the data when the user has finished entering the entire main body data. In another embodiment, the user device may simultaneously receive and process the data as the user is composing the main body data.

In step 1308, the user device extracts keyterms from the subject line data and/or the main body data. In one embodiment, the user device may choose the entire subject line data as a keyterm. In another embodiment, the user device may disregard trivial words such as, for example, "a", "an", "the", "is", etc., in the subject line and/or main body and store the remaining terms as one or more keyterms. In yet another embodiment, the user device may search for sequences of repeated lexical items which appear multiple times, or lexical items which appear more than a predetermined number of times, in the main body and/or subject line and store them as keyterms. In yet another embodiment, the user device may target terms which match a predetermined part-of-speech pattern such as, for example, "noun and noun", "adjective and noun", etc. to be stored as keyterms. One skilled in the art would recognize that the term extraction utilized by the user device is not limited to the above-mentioned embodiments, but may include any method of extracting terms from a body of text which is known in the art.

In step 1310, the user device applies a weighting scale to the keyterms. The weighting scale may be based on, for example, how many times a keyterm appears in the subject line and/or main body, whether the keyterm appears in the subject line, where in the main body the keyterm is located, what phrases are located within the vicinity of the keyterm, etc. The weighting may be used to determine, for example, the relevance of alert content which is located with said keyterm, whether the alert content should be delivered to the user, in what order the alert content should be delivered to the user, etc.

In step 1312, the user device determines if an autofilter is enabled. If the autofilter is enabled, the user device may continuously provide updated alert content to the user. For example, throughout the time the user is composing the message, the user device may continue to search for new keyterms in the subject line and/or main body, apply the appropriate weighting scales to the keyterms, suitably sort the alert content, and deliver the alert content to the user. If the autofilter is not enabled, then the user device may search for keyterms and apply a weighting scale once. Typically, if autofilter is not enabled, locating the keyterms may occur after the user has completed composing the main body. However, in other embodiments, this may occur after the user requests to finalize and send the message, after the user inputs a message recipient, after the user inputs a subject line, at any suitable time period during the process, etc.

If the autofilter is not enabled, then it is not necessary to continuously update the keyterms, weighting scales, and/or alert content. The process proceeds to point B 1314 and from there may execute process 1200 by proceeding to point B 1202. As described previously, process 1200 may finalize the message alert process by locating alert content, appropriately sorting the alert content, delivering the alert content to the user, and prompting the user whether he would like to continue with the initial communication request. If the user device receives instructions to proceed with the communication request in step 1224 of FIG. 12, the user device may, for example, send the e-mail message to the second party's friendly device, send the SMS text message to the second party's friendly device, etc.

If the autofilter is enabled in step 1312, the process may proceed to step 1316 and continuously update the keyterms, update the weighting scales, locate alert content., appropriately sort the alert content, and/or deliver the alert content to the user. In steps 1316-1320, similar to steps 1204-1206 and step 1214 of FIG. 12, the user device will locate alert content based on the keyterms and preferences, pre-sort the alert content based on the preferences, and then deliver the alert content to the user. Once again, the preferences were determined and then stored in steps 1010-1012 of the previous executed process 1000. A description of how steps 1316-1320 may operate was described in more detail above in regards to similar steps 1204-1206 and 1214.

In step 1322, the user device determines whether the user device is still receiving message content from the user. As used herein, "message content" refers to the text entered into the main body and/or subject line of a message such as, for example, an e-mail message or an SMS text message. For example, if the user has not completed composing the main body and/or subject line, then the user device may still be receiving message content from the user. The user device may not be receiving message content from the user when, for example, the user inputs a request to finalize and/or send the message, after a predetermined period of time has passed without receiving message content from the user, etc. In response to the user device still receiving message content from the user, the process may proceed to step 1304 and continue to loop from 1304-1322 until the user device is no longer receiving message content. Therefore, as long as the user device is receiving message content, the process may still receive subject line and/or main body data, extract keyterms from the subject line and/or main body data, apply weighting scales to the keyterms, locate alert content with the keyterms and preferences, sort the alert content, and/or deliver the alert content to the user.

In response to the user device not receiving additional message content, the process may proceed to step 1324. Similar to steps 1210-1212 and step 1222-1224, steps 1324-1330 of FIG. 13 may finalize the communication request. The process may first wait for the user to finish considering the alert content in step 1324, and then may prompt the user whether he would like to finalize the communication request (i.e., finish sending the e-mail message, finish sending the SMS text message, etc.) in step 1326. In response to the user device receiving instructions not to finalize the communication request, the process ends at step 1330. However, if the user device receives instructions to proceed with the communication, then in step 1328 the user device finalizes the communication request (i.e., sends the e-mail, sends the SMS text messages, etc.). A description of how steps 1324-1330 can be carried out was described in more detail above in regards to similar steps 1210-1212 and 1222-1224.

Figure 14:
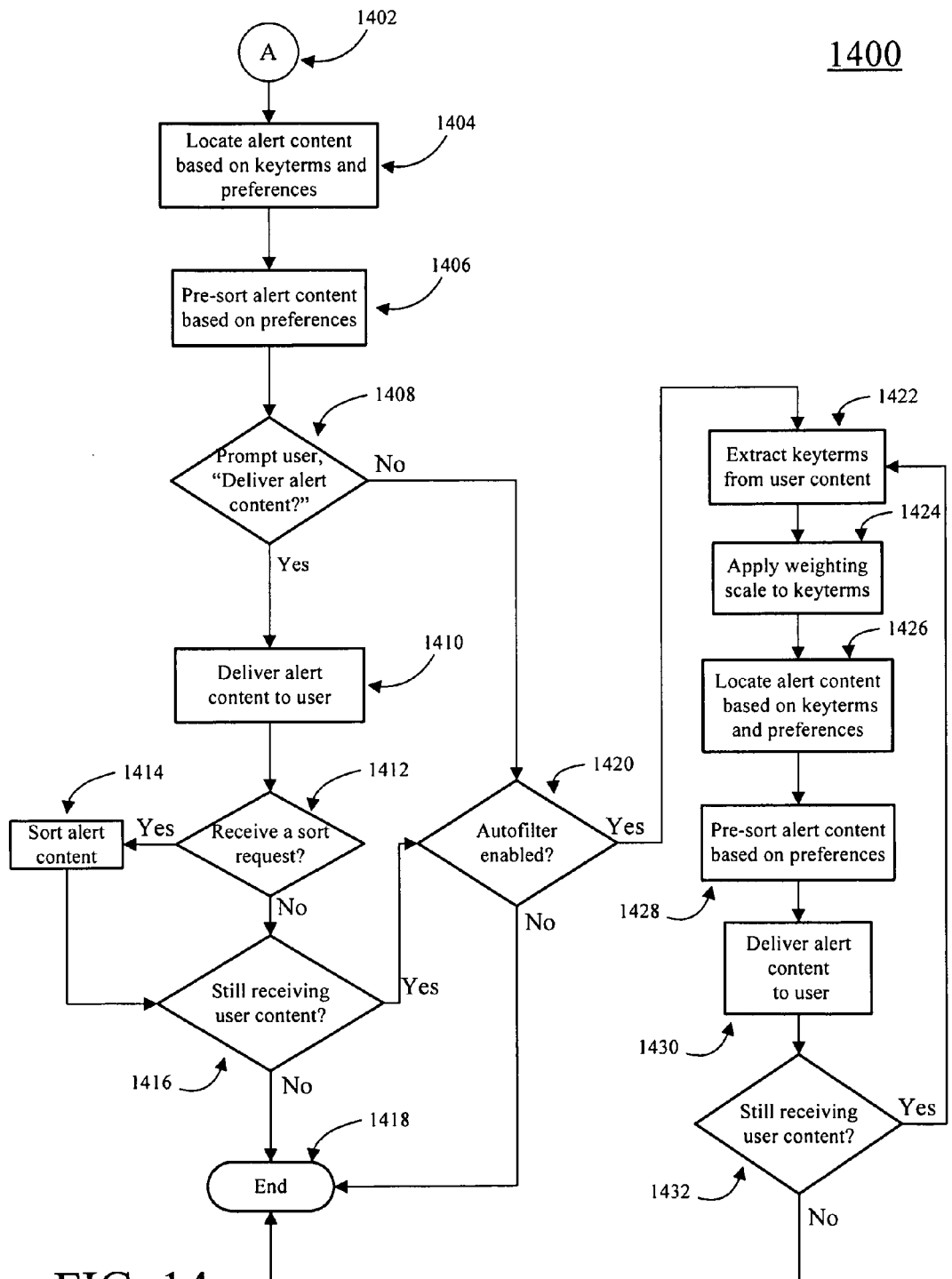

In addition to process 1100 or process 1300, when process 1000 of FIG. 10 completes at point A 1020, the system may alternatively proceed to point A 1402 of FIG. 14. Process 1400 may be executed when the user is facilitating communications with a second party by sending real time, text-based conversations through services such as, for example, AOL Instant Messenger™, Windows® Messenger, etc. Process 1400 possesses many of the same features as processes 1200 and 1300 and, similar to process 1300, may allow the user device to continuously update and deliver alert content to the user. This process may be utilized, for example, when the user is typing a real time conversation to a second party. As the user types, he provides more data for the user device. The user device may then process the data as it is received to locate more keyterms, locate more alert content, and deliver the updated alert content to the user.

Process 1400 is initialized in a similar manner as process 1200. Steps 1404-1408 may function the same as steps 1204-1208 in that they can locate alert content based on keyterms and preferences, pre-sort the alert content based on the preferences, and then prompt the user to determine whether the user would like to receive the alert content. Once again, the keyterms can be determined in steps 1008 and 1018 of previously executed process 1000. The keyterms are related to the second party contact information, whether this contact information was provided by the user or extracted from an address book. For example, the second party contact information may be the second party's name, screenname, e-mail address, phone number, etc. Additionally, the preferences can be determined in steps 1010-1014 of previous process 1000.

In response to the user device receiving instructions to deliver the alert content, the process proceeds to step 1410. The alert content may be delivered, for example, through display circuitry 406 to display screen 114 or display component 206 as textual and/or graphical information. For example, FIGS. 6 and 8 are illustrative embodiments of two ways in which the user device may deliver the alert content as textual and/or graphical information. As another embodiment, the user device may deliver the alert content through, for example, input/output circuitry 414 to earphones/speakers 106 and 108 as audio information.

After the user device has delivered the alert content to the user, in step 1412 the user device may determine if a sort request has been received. If a request has been received, similar to step 1218 or FIG. 12, the user device appropriately sorts the alert content before proceeding. If no sort request was received, the process proceeds without sorting. Although steps 1412-1414 are illustrated as proceeding directly after step 1410, one skilled in the art would appreciate that steps 1412-1414 may be additionally or alternatively be located anywhere in steps 1416-1430. Thus, it may be possible for the user to request a sorting process at any suitable point in process 1400.

In step 1416, the user device determines if user content is still being received from the user. As used herein, "user content" refers to text-based conversations which the user is sending in real time to the second party. The user device may determine that user content is no longer being received from the user when, for example, the user inputs a request to end the conversation, after a predetermined period of time has passed without receiving user content from the user, when the display window containing the conversation has been closed or minimized, etc. If user content is no longer being received, no more alert content is located and the process ends at step 1418.

In response to the user device continuing to receive user content, step 1420 determines if an autofilter is enabled. When an autofilter process is enabled, the user device may continuously locate and deliver updated alert content to the user as user content is received. The updated alert content may be located based on the user's (text-based) conversation with the second party. If the autofilter is not enabled, then the alert content which can be delivered to the user is generally the alert content which was located with keyterms related to the second party contact information, as referenced in step 1410 (additional keyterms may be determined from the content of the message itself as the user prepares it—but, without autofilter being enabled, the user may have to individually tag words in the message as keywords). If the user had instructed, in step 1408, to not have alert content based on second party contact information delivered to him, the process also proceeds to step 1420. This allows the user the option of receiving alert content based on the conversation with the second party even if he did not receive alert content based on the second party contact information.

If the autofilter is not enabled, and no more alert content is located, the process ends at step 1418. If the autofilter is enabled, then the process proceeds to steps 1422. In step 1422, the user device extracts keyterms from the user content. Similar to step 1308 of FIG. 13, the user device may extract keyterms by, for example, searching for sequences of repeated lexical items which appear multiple times, searching for lexical items which appear more than a predetermined number of times, searching for terms which match a predetermined part-of-speech pattern, any suitable technique known in the art for extracting terms from a body of text, etc.

In step 1424, the user device applies a weighting scale to the keyterms. The weighting scale may be based on, for example, how many times a keyterm appears in the conversation, where in the conversation the keyterm is located, what additional phrases are located within the vicinity of the keyterm, etc. The weighting may be used to determine, for example, the relevance of alert content which is located with said keyterm, whether the alert content should be delivered to the user, in what order the alert content should be delivered to the user, etc.

Steps 1426-1430 can function in the same manner as steps 1316-1320 of FIG. 13. The user device can locate new alert content based on all keyterms and the preferences. The new alert content and any previously located alert content can be pre-sorted based on the preferences, and then the alert content is delivered to the user. Step 1432 may then determine if the user device is still receiving user content. In the same manner as step 1416, the user device may determine that user content is no longer being received when, for example, the user inputs a request to end the conversation, after a predetermined period of time has passed without receiving user content from the user, when the display window containing the conversation has been closed, etc. If user content is no longer being received, no more alert content is located and the process ends at step 1418. In response to user content still being received, the process proceeds back to step 1422 and continues to loop between steps 1422-1432 until the system stop receiving user content. In this manner, as long as the user is communicating with a second party through text-based conversations, such as instant messaging, etc., the process may continue to locate and deliver alert content to the user.

It is understood that the principles of the present invention are not limited to the communications systems described in the discussions above and can be applied to any type of communications system or connection.

Various configurations described herein may be combined without departing from the present invention. The above described embodiments of the present invention are presented for purposes of illustration and not of limitation. The present invention also can take many forms other than those explicitly described herein. Accordingly, it is emphasized that the invention is not limited to the explicitly disclosed methods, systems and apparatuses, but is intended to include variations to and modifications thereof which are within the spirit of the following claims.

What is claimed is:

1. A method of providing alert content to a user prior to the user communicating with a second party, comprising:
    receiving input into a message on a mobile device, the input comprising a plurality of keyterms, wherein the input is received when the mobile device is in process of initiating a communication with another device, and the plurality of keyterms comprise at least two of: contact information of a recipient of the message, one or more words of a subject line of the message, or one or more words of the body of the message, wherein receiving input into a message comprising a plurality of keyterms comprises receiving an input tagging a word in the message as a keyterm;
    identifying, within local storage in the mobile communication device, a plurality of received messages that are associated with one or more of the keyterms, wherein the plurality of received messages comprise alert content, and the alert content comprises at least one of read text-based messages or heard audio messages, and at least one of unread text-based messages or unheard audio messages;
    retrieving a plurality of configuration settings;
    in response to the identifying, providing the alert content to the user in accordance with the plurality of configuration settings, wherein the configuration settings determine when the device is to deliver the alert content to the user relative to when the mobile device receives input into the message and when a connection for sending the message is completed.

2. The method of claim 1, further comprising:
providing a prompt to the user to decide whether to proceed with initiating a communication with the second party.

3. The method of claim 1, wherein receiving input comprising a plurality keyterms and identifying a plurality of received messages continues until the message is finalized or sent.

4. The method of claim 1, wherein identifying comprises:
reading through at least one of text-based messages and audio messages which have been converted to text-based messages.

5. The method of claim 1, wherein providing the alert content to the user comprises:
giving the user an option to review at least some of the alert content located during searching; and
supplying the at least some of the alert content to the user if the user opts to review it.

6. The medium of claim 1, wherein the configuration settings are to determine when the device is to deliver the alert content to the user including (1) after the user enters second party contact information and (2) after the device initiates communications with the second party but before the connection with the second party's device is completed.

7. Apparatus for providing alert content to a user prior to communicating with a second party comprising:
receiver circuitry in a handheld mobile communication device for receiving input into a message on the handheld mobile communication device, the input comprising a plurality of keyterms, wherein the input is received when the handheld mobile communication device is in process of initiating a communication with another device, and the plurality of keyterms comprise at least two of: contact information of a recipient of the message, one or more words of a subject line of the message, or one or more words of the body of the message, wherein receiving input into a message comprising a plurality of keyterms comprises receiving an input tagging a word in the message as a keyterm;
searching circuitry in the handheld mobile communication device for identifying within local storage in the handheld mobile communication device a plurality of received messages that are associated with one or more of the keyterms, wherein an alert content comprises at least one of read text-based messages or heard audio messages, and at least one of unread text-based messages or unheard audio messages;
retrieval circuitry in the handheld mobile communication device for retrieving a plurality of configuration settings;
alert circuitry in the handheld mobile communication device for providing the alert content to the user in accordance with the configuration settings, wherein the configuration settings determine when the handheld mobile communication device is to deliver the alert content to the user relative to when the handheld mobile communication device receives input into the message and when a connection for sending the message is completed; and
prompt circuitry in the handheld mobile communication device for providing a prompt to the user to decide whether to proceed with the request to communicate with the second party.

8. The apparatus of claim 7, wherein receiving comprising a plurality of keyterms and identifying a plurality of received messages continues until the message is finalized or sent.

9. The apparatus of claim 7, wherein the receiver circuitry further comprises:
processing circuitry for processing a request to send a text-based message to another party through the handheld mobile communication device.

10. The apparatus of claim 7, wherein the receiver circuitry further comprises:
processing circuitry for processing a request to speak with the second party through the handheld mobile communication device.

11. The apparatus of claim 7, wherein searching circuitry comprises at least one of:
circuitry for reviewing read text-based messages;
circuitry for reviewing unread text-based messages;
circuitry for reviewing heard audio messages; and
circuitry for reviewing unheard audio messages.

12. The apparatus of clam 7, wherein searching circuitry comprises:
circuitry for reviewing text-based messages and audio messages which have been converted to text-based messages.

13. The apparatus of claim 7, wherein the configuration settings indicate that alert content is to be provided when one of: after the user enters text into a subject line of the message, while the user is entering a subject line in the message, or while the user is entering text into a main body of the message.

14. The apparatus of claim 7, wherein the configuration settings to determine when the device is to deliver the alert content to the user including (1) after the user enters second party contact information and (2) after the device initiates communications with the second part but before the connection with the second party's device is completed.

15. A non-transitory computer-readable medium programmed with executable instructions that, when executed, perform a method of providing alert content to a user, comprising:
receiving input into a message on a mobile device, the input comprising a plurality of keyterms, wherein the input is received when the mobile device is in process of initiating a communication with another device, and the plurality of keyterms comprise at least two of: contact information of a recipient of the message, one or more words of a subject line of the message, or one or more words of the body of the message, wherein receiving input into a message comprising a plurality of keyterms comprises receiving an input tagging a word in the message as a keyterm;
identifying, within local storage in the handheld mobile communication device, a plurality of messages that are associated with one or more of the keyterms, wherein alert content comprises at least one of read text-based messages or heard audio messages, and at least one of unread text-based messages or unheard audio messages;
retrieving a plurality of configuration settings; and
providing the user with the alert content to review in accordance with the configuration settings, wherein the configuration settings determine when the device is to deliver the alert content to the user relative to when the mobile device receives input into the message and when the device sends the message.

16. The medium of claim 15, further comprising:
providing the user with a prompt to decide whether to proceed with the request to send the message.

17. The medium of claim 15, wherein identifying comprises at least one of:
  reviewing read text-based messages;
  reviewing unread text-based messages;
  reviewing heard audio messages; and
  reviewing unheard audio messages.

18. The medium of claim 15, wherein identifying comprises at least one of:
  scanning through text-based; and
  scanning through audio messages which have been converted to text-based messages.

19. The medium of claim 15, wherein providing the user with the message content comprises:
  prompting the user with the option to review at least some alert content found during searching; and
  supplying the at least some alert content to the user if the user opts to review it.

20. The medium of claim 19, wherein the configuration settings indicate that alert content is to be provided when one of: after the user enters text into a subject line of the message, while the user is entering a subject line into the message, or while the user is entering text into a main body of the message.

21. The medium of claim 15, wherein the configuration settings are to determine when the device is to deliver the alert content to the user including at least two of the group consisting of (1) after the user enters the second party contact information, (2) while the user is entering a subject in the text-based message, (3) after the user enters the subject in the text-based message, (4) while the user is entering a message body in the text-based message, and (5) after the user chooses to send the text-based message but before the device has sent the text-based message.

* * * * *